United States Patent [19]

Youngren

[11] 4,072,774

[45] Feb. 7, 1978

[54] SEALING METHOD FOR POROUS MATERIAL

[75] Inventor: Fred R. Youngren, Lexington, Mass.

[73] Assignee: The United States of America as represented by the Secretary of the Army, Washington, D.C.

[21] Appl. No.: 587,741

[22] Filed: June 18, 1975

[51] Int. Cl.$^2$ .......................... B05D 3/00; B05D 3/02
[52] U.S. Cl. .................................. 427/294; 427/169; 427/314; 427/430 B
[58] Field of Search ................ 427/430, 169, 314, 294

[56] References Cited

U.S. PATENT DOCUMENTS

| | | | |
|---|---|---|---|
| 1,746,826 | 2/1930 | Farr, Jr. ........................... | 427/430 X |
| 1,825,509 | 9/1931 | Collins ................................. | 427/430 |
| 3,157,534 | 11/1964 | Domicone et al. ............... | 427/430 X |
| 3,279,942 | 10/1966 | Granitsas et al. ................ | 427/169 X |
| 3,384,505 | 5/1968 | Palmer et al. .................... | 427/430 X |

OTHER PUBLICATIONS

Dow Corning Corp. Publications-Guide, July 20, 1962, Cover Page and pp. 15-18.

Primary Examiner—Richard D. Lovering
Attorney, Agent, or Firm—Nathan Edelberg; Robert P. Gibson; James T. Deaton

[57] ABSTRACT

A process for sealing a rectangular porous object against water absorption includes cleaning and drying the object to constant weight thereof, and in an ambient atmosphere immersing the object to a portion of the shortest dimension thereof in a sealant with the temperature of the ambient atmosphere and the sealant maintained at the minimum viscosity temperature of the sealant.

3 Claims, No Drawings

SEALING METHOD FOR POROUS MATERIAL

BACKGROUND OF THE INVENTION

The sealing process is based on the theory that the flow of liquids through porous material depends on the viscosity, surface tension and wetting angle of the liquid and the size and length of the pore channels in the object. Capillary forces are the driving power to force the liquid through the porous objects. Surface tension forces are $$F_c = 2\pi r\, t \cos \theta$$

where $F_c =$ average capillary force, $r =$ the average radius of a pore, $T =$ the surface tension at the vapor-liquid-solid interface and $\theta =$ the wetting angle.

SUMMARY OF THE INVENTION

Fused silica is suitable as a material for radomes except that the porosity of such material causes it to absorb 5 to 6 percent by weight of water that interferes with the passage of radar waves therethrough. Methods of coating and sealing the material, even these that include total immersion under evacuated conditions failed to completely penetrate the material. It appears that in such methods the surface initially becomes partially sealed to render it more difficult for internal air to be replaced by sealant. The instant method of partial immersion of the material provides a free surface for escape of internal air as sealant flows into the material.

Capillary forces drive liquid through the pores of an object and it has been found that flow of liquids through pores of an object depends on the pore size and length of channels in the object as well as the viscosity, surface tension and wetting angle of the liquid. Forces due to surface tension are:

$$F_c = 2\pi r\, T \cos \theta$$

where $F_c$ is the average capillary force, $r$ the average radius of a pore channel, $T$ the surface tension at the vapor-liquid-solid interface, and $\theta$ the wetting angle. This force is equivalent to pressure $P_c$:

$$P_c = (2\, T \cos \theta / r)$$

where $P_c$ is the equivalent capillary pressure developed obtained by dividing the average force $F_c$ by the cross-sectional area $\pi r^2$.

For a wetting angle less than 90°, the capillary forces are positive tending to draw the liquid into the pores. For small values of $r$ this capillary pressure is formidable, for example, the capillary pressure of water in a 2 micron diameter capillary is approximately 1.4 atmospheres, increasing to 14 atmospheres in a 0.2 micron diameter capillary.

Flow rate $\dot{V}$ through a porous solid depends upon the driving pressures including the capillary forces, the viscosity of the liquid and the length of the pores:

$$\dot{V} = \pi r^4 P_c / 8 \eta l$$

where $\dot{V}$ is the volume flow rate, $P_c$ the driving pressure, $r$ the radius of the pores, $\eta$ the viscosity of the fluid, and $l$ the average pore length. Assuming cylindrical pores, the time required to fill a pore is:

$$t_{fill} = V \cdot \dot{V} = 4 \eta l^2 / T \cos \theta\, r$$

Comparative parameter values of water and a silicone resin such as Dow Corning Resin No. 7521 of equal surface tension are given in Table I.

Dow Corning Resin No. 7521 is commercially available from the Dow Corning Corporation; James Savage Road, Midland, Michigan 48640.

TABLE I

| | Water | DC 7521 | |
|---|---|---|---|
| Surface tension ($\frac{dynes}{cm}$) | 71.97 | 71.97 | |
| Viscosity (Centipoise) | 1 | 117 | |
| Average column length (cm) | 1.27 | 1.27 | |
| Assumed Wetting Angle (degrees) | 0 | 0 | (assumed for order of magnitude estimate) |

Average column length assumed to be twice the sample thickness to allow for a meander of pores through the porous solid.

A semi-quantative comparison of the time required to fill a 0.25 inch thick porous body with water and DC 7521 is given in Table II.

TABLE II

| Pore radius microns | Filling Time (seconds) | |
|---|---|---|
| | Water | DC 7521 |
| 10 | 0.897 | 378 |
| 1 | 8.97 | 3780 (1.05 hrs) |
| 0.1 | 89.7 | 37800 (10.5 hrs) |
| 0.01 | 897 | 378000 (105 hrs) |

Table III lists the pressures expected

TABLE III

| Pore size microns | Pressure (atmosphere) | |
|---|---|---|
| | Water | DC 7521 |
| 10 | 0.142 | 0.0395 |
| 1 | 1.42 | 0.395 |
| 0.1 | 14.2 | 3.95 |
| 0.01 | 142 | 39.5 |

According to Georgia Tech High Temperature Research Facility the pore radii of a fused silica sample are 0.5 to 1 microns to produce equivalent capillary pressures of approximately one atmosphere (14.7 lbs/sq in). Total impregnation time therefore can be cut at least in half by the application of pressure and vacuum to opposite sides of a sample.

Since filling time is directly proportionate to the square of the pore length, methods requiring filling through the shortest dimension of the object are preferred.

Since the quantities determined theoretically were order of resin magnitude numbers due to lack of the exact values of surface tension of 7521 and the average length of a pore, a sample was immersed with one face exposed to air and the bottom face supported off the bottom of the liquid container to find that the filling time of the sample was between 3 and 16 hours as determined by visual inspection of the exposed surface of the sample.

In samples of fused silica impregnated by this method with the ambient and sealant temperatures maintained at the minimum viscosity temperature of the sealant, moisture absorption of the samples has been reduced to a maximum of one tenth of one percent by weight because of the thorough penetration of the sample by the sealant.

I claim:

1. A process for impregnation of a fused silica porous object having pore radii of about 0.5 to about 1 micron with a sealant in an ambient atmosphere comprising:

cleaning contaminants from said object an drying thereof;

immersing said object to a depth of a portion of the shortest dimension thereof in a resin sealant; and maintaining said atmosphere and said sealant at the temperature of minimum viscosity thereof for three to sixteen hours for substantially complete impregnation of the pores of said object by said sealant to provide a sealed object.

2. An impregnation process as in claim 1 for limitation of the moisture absorption of said object after the impregnation to 0.1% of the weight thereof responsive to application of said drying until successive weights of said object become equal.

3. An impregnation process as in claim 1 with positive and negative pressures respectively applied to said sealanat and said object for reduction of the time required for said impregnation.

* * * * *